United States Patent [19]

Castner

[11] 4,038,471
[45] July 26, 1977

[54] METHOD FOR PREPARING HIGH-CIS POLYALKENAMERS

[75] Inventor: Kenneth F. Castner, Akron, Ohio

[73] Assignee: The Goodyear Tire & Rubber Company, Akron, Ohio

[21] Appl. No.: 736,810

[22] Filed: Oct. 29, 1976

[51] Int. Cl.² .................. C08F 4/78; C08F 32/04; C08F 32/06

[52] U.S. Cl. .............. 526/142; 252/429 B; 526/143; 526/308

[58] Field of Search ................ 526/142, 143, 308

[56] References Cited

U.S. PATENT DOCUMENTS

| 3,652,487 | 3/1972 | Ward et al. | 526/142 |
|---|---|---|---|
| 3,943,116 | 3/1976 | Bell | 526/308 |
| 3,974,094 | 8/1976 | Streck et al. | 526/144 |

*Primary Examiner*—Edward J. Smith
*Attorney, Agent, or Firm*—F. W. Brunner; J. Y. Clowney

[57] ABSTRACT

There is disclosed a method which comprises polymerizing a cycloolefin selected from the group consisting of cyclooctene and 1,5-cyclooctadiene by subjecting said cycloolefin to a catalyst comprising (A) a tungsten halide salt of the general formula $R_{m-n}WX_n$ wherein X represents chlorine or bromine and R is selected from the group consisting of alkoxy, haloalkoxy, aryloxy, alkaryloxy, and acetyl acetonyl radicals containing up to 20 carbon atoms; $m$ being 6 when X= Cl or 5 when X = Br; and wherein $n$ may be 3 to 6 inclusive when X = Cl or 3 to 5 inclusive when X = Br and (B) an organoaluminum compound of the formula:

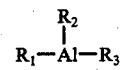

wherein $R_1$, $R_2$ and $R_3$ may independently represent an alkyl or aralkyl radical containing up to 20 carbon atoms or a halogen atom, and (C) a hydroxyl compound of the formula ROH wherein R is selected from the group consisting of alkyl, haloalkyl, cycloalkyl, aralkyl, alkoxyalkyl and aryl containing up to 20 carbon atoms, and (D) a hindered phenol of the formula

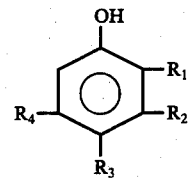

wherein $R_1$ represents an alkyl group with a tertiary carbon attached to the aromatic ring, and $R_2$, $R_3$ and $R_4$ represent either a hydrogen atom or an alkyl group containing up to 20 carbon atoms, to form polyalkenamers having a cis-vinylene content of at least about 85 percent, and wherein the molar ratio of A:B:C:D ranges from 1:2–8:0.5–3:3–24.

6 Claims, No Drawings

METHOD FOR PREPARING HIGH-CIS POLYALKENAMERS

This invention is directed to a process for the preparation of high-cis polyoctenamer and high-cis polybutenamer (or copolymers thereof). The formation of high-cis polyoctenamer and high-cis polybutenamer is accomplished by the ring-opening polymerization of cyclooctene and 1,5-cyclooctadiene, respectively, by a catalyst system comprising (A) a tungsten halide salt, (B) an organoaluminum compound, (C) a hydroxy compound of the general formula ROH, such as an alcohol or phenol, and (D) hindered phenols, that is, phenols which are substituted by one bulky group at one ortho position.

By ring-opening polymerization is meant a process whereby cycloolefins, in the presence of an olefin metathesis catalyst, form high molecular weight polyalkenamers.

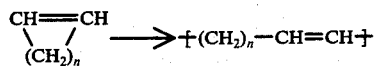

It should be noted that in polyalkenamers resulting from the ring-opening polymerization of cycloolefins, the repeating polymer segments contain the same number of carbon atoms and double bonds as the cycloolefin polymerized. This is to be contrasted with addition polymers, prepared from acyclic olefins and diolefins, wherein the polymer segments contain one less double bond than the employed olefin or diolefin monomer contained.

Recently, much emphasis has been placed on obtaining high-cis polybutadiene and high-cis polyisoprene from the addition polymerization of butadiene and isoprene, respectively, because of the certain desirable properties associated with these high-cis elastomers.

The polymer obtained by the ring-opening polymerization of 1,5-cyclooctadiene which may be represented as polyoctadienamer (I) or polybutenamer (II):

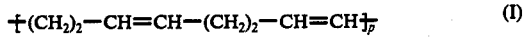

These two polymers, polyoctadienamer (I) and polybutenamer (II), are identical to each other. For the most part, these two polymers are the same as a high-cis polybutadiene prepared by the addition polymerization of butadiene. One essential difference should be noted, however. High 1,4-polybutadiene contains at least some vinyl side chain units as a result of the occurrence of some "1,2-addition," (along with the normal 1,4-addition), during the addition polymerization of the 1,3-butadiene monomer. Such vinyl units are totally absent in polyoctadienamer (I) and polybutenamer (II), however, owing to the mechanism inherent in ring-operation polymerizations of cycloolefins wherein the formation of such pendant groups cannot occur.

In the prior art processes of ring-opening polymerizations of cycloolefins and cyclodiolefins, somewhat less than 90 percent of the vinylene (—CH═CH—) units of the polymer products are in the cis configuration. It is one of the advantages of the present invention that by employing the processes described herein, polyalkenamers (i.e. polyoctenamer and polybutenamer), can be obtained which have cis-vinylene contents of near or greater than 90 percent.

According to the invention at least one cycloolefin selected from the group of cyclooctene and 1,5-cyclooctadiene is ring-opened polymerized by means of a catalyst system comprising (A) a tungsten halide salt of the general formula:

wherein X represents chlorine or bromine and R is selected from the group consisting of alkoxy, haloalkoxy, aryloxy, alkaryloxy and acetyl acetonyl radicals; $m$ being 6 when X is Cl or 5 when X equals Br; and wherein $n$ may be 3 to 6 inclusive when X equals Cl or 3 or 5 inclusive when X equals Br; and (B) an organoaluminum compound of the formula:

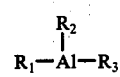

wherein $R_1$, $R_2$ and $R_3$ may independently represent an alkyl or aralkyl radical containing up to 20 carbon atoms, or a halogen atom; and (C) a hydroxyl compound of the formula:

ROH wherein R is selected from the group consisting of alkyl, haloalkyl, cycloalkyl, aralkyl, alkoxyalkyl, and aryl containing up to 20 carbon atoms; and (D) a hindered phenol of the formula:

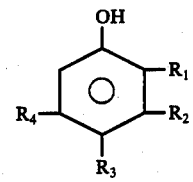

wherein $R_1$ represents an alkyl group with a tertiary carbon attached to the aromatic ring, and $R_2$, $R_3$ and $R_4$ represent either a hydrogen atom or an alkyl group containing up to 20 carbon atoms, to form polyalkenamers having a cis-vinylene content of at least about 85 precent, and wherein the molar ratio of A:B:C:D ranges from 1:2-8:0.5-3:3-24.

In (B) above, it is preferable that the compound contain at least one aluminum to carbon bond.

Representative but not exhaustive of the compounds of the formula:

or (A) of the catalyst system are tungsten hexachloride, phenoxy-tungsten pentachloride, (2-chloroethoxy)tungsten pentachloride, ethoxytungsten tetrabromide, di-(2-chlorophenoxy)tungsten tetrachloride, acetylacetonyl tungsten pentachloride, tungsten pentabromide, tungsten oxytetrachloride, tungsten oxytetrabromide and the like.

Representative but not exhaustive of the compounds of the formula:

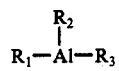

or (B) of the catalyst system are trialkylaluminums, such as triethylaluminum, triisobutylaluminum and the like; dialkylaluminum halides, such as diethylaluminum chloride, diethylaluminum bromide and the like; mixtures of dialkylaluminum halides and alkylaluminum dihalides, such as ethylaluminum sesquichlorides; and alkylaluminum dihalides, such as ethylaluminum dichloride, ethylaluminum dibromide and the like.

Representative but not exhaustive of the compounds of the formula:

ROH or (C) of the catalyst system are the simple aliphatic alcohols such as methyl, ethyl, propyl, isopropyl, n-butyl, sec-butyl and t-butyl alcohol, cyclopentanol, cyclohexanol, phenol, alkyl phenols such as o-, m- and p-cresol and the like, and substituted alcohols such as benzyl alcohol, 2-chloroethanol, 2,2,2-trichloroethanol, 2-bromoethanol, 2-cyanoethanol, 2-ethoxy-ethanol, 2-methoxyethanol, and the like.

Representative but not exhaustive of the compounds of the formula:

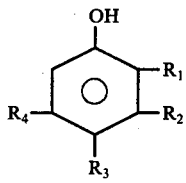

or (D) of the catalyst system are 2-t-butylphenol, 2-t-butyl-m-cresol, 2-t-butyl-p-cresol and 2-t-hexyl-p-cresol.

The major effect of the hindered phenol component (D) of the catalyst system can be readily ascertained by comparing the cis-vinylene content of the polymers obtained when it is employed, with those obtained by the same (A), (B), and (C) combination of the catalyst in the absence of (D) or with a fourth component different from (D). In some cases where (A), (B) and (C) in combination alone give a polymer with a cis double bond content as low as 25 percent for polyoctenamer, the addition of (D) to the monomer solution prior to the employment of the same (A), (B), (C), combination, using otherwise identical conditions results in the formation of a polymer with a cis double bond content of better than 90 percent. In other cases where (A), (B), and (C) along with a fourth component such as pentachlorophenol, catechol, or 2-cyclohexyl phenol are used, a polymer with a cis double bond content ranging from 27 to 76 percent results, and when this fourth component is replaced by (D), the resultant cis double bond content in the polymer formed will be near 90 percent or above 90 percent.

The polymerizations of this invention may be conducted in solution or in bulk. When the polymerization is carried out in solution, solvents which do not adversely affect the polymerization are required. Representative of such solvents meeting this specification are liquid aromatic hydrocarbons, such as benzene, chlorobenzene and toluene; and liquid aliphatics such as pentane, hexane, cyclohexane and the like.

It has been found that good results are obtained in the practice of the invention when the molar relationship between the four catalyst components (A), (B), (C), and (D), as previously defined, are within a molar ratio of A:B:C:D ranging from 1:2–8:0.5–3:3–24. More preferred are A:B:C:D molar ratio of 1:4.6:1:3.7 for bulk polymerizations and 1:4.6:1:4.6 for solution polymerizations.

Another way of expressing the molar relationship of (A) to (B) to (C) to (D) would be ranges of A/B of 1/2–8, A/C of 1/0.5–3 and A/D of 1/3–24. A more preferred range of A/B of 1/4–5, A/C of 1/0.7–1.3 and A/D of 1/3–4 if bulk polymerization is used and a range A/B of 1/4–5, A/C of 1/0.7–1.3 and A/D of 1/4–5 if solution polymerization is employed.

The catalysts employed in this invention are prepared by mixing the components by known techniques. Thus, the catalysts may be prepared by "pre-formed" or in-situ techniques. In the "pre-formed" method, the catalyst components are mixed together prior to exposure of any of the catalyst components to the cyclic monomers to be used in the polymerization reaction. In the in-situ method, the catalyst components are added separately to the cyclic monomers in the polymerization mixture. In the practice of this invention, the latter method is preferred, and in the preferred order wherein component (A) and (C) were mixed together, then the components added to the cyclic monomers in the following order:component (D) followed by component (A)/(C) which were previously mixed together, and finally, component (B). The order of addition of the components to the cyclic monomer can also advantageously be component (D) followed by component (B) and finally by components (A)/(C) which were previously mixed together.

The amount of catalyst employed in the polymerization reactions may range over a wide concentration and depends upon a number of factors, such as the purity of the reactants, the reaction times desired and the temperature employed. Successful polymerization reactions can be conducted when the molar ratio of component (A) to monomer is as low as 1 to 8,000 to less.

Temperatures at which the polymerization reactions can be carried out can also be varied over a wide range from extremely low temperatures, such as −40° C. up to high temperatures, such as 150° C. and are, thus, not critical. In the practice of this invention, however, it is generally preferred to conduct the reaction at a temperature in the range of −10° C. to about 25° C. Although the cis/trans ratio of the double bond content of the polymer product has not been found to be changed drastically by variations of the temperatures within the preferred range, it has been noted that, in general, a slightly higher cis double bond content is obtained in the polymer when the polymerizations are conducted at the lower end of the temperature range, all other factors being equal.

The control of the molecular weight of the homopolymers and copolymers of the present invention can be conveniently carried out by the incorporation of minute amounts of acyclic olefins in the respective polymerization recipes. The process by which the molecular scission can occur in the metathesis of a vinylene (—CH=CH—) main chain double bond and the double bond of the added acyclic olefin is

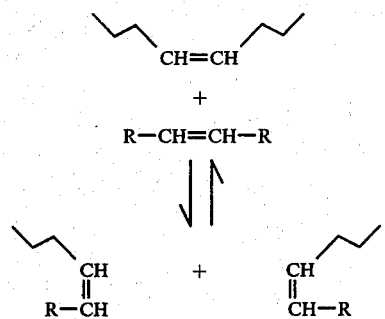

A noteworthy feature of the catalyst system of this invention is that, during the course of a given polymerization, the cis/trans ratio of the double bond content of the polymer generally remains fairly constant. That is, little change is noted in the "cis content" of the final polymer product when compared, for example, with a sample of the polymer taken after 5 percent monomer-to-polymer conversion. Moreover, no significant decrease in the cis double bond content of the polymer is generally found when the polymerization, after complete conversion of monomer to polymer, is allowed to remain unterminated for long periods of time. All of the this indicates that the inclusion of the hindered phenol as defined in this invention, in the catalyst system makes the combination of (A), (B), (C) and (D) of the catalyst system truly a cis-directing catalyst when used in the ring-opening polymerization of cyclooctene and/or 1,5-cyclooctadiene.

As stated earlier, the essential difference between polybutenamer, prepared by the ring-opening polymerization of 1,5-cyclooctadiene, and polybutadiene, prepared by the addition polymerization of 1,3-butadiene, is the total absence of any vinyl side chain units in the former. Hence, the polymers obtained from 1,5-cyclooctadiene by the process described in this invention represent, in effect, "vinyl-free" high-cis 1,4-polybutadiene rubber.

The polymers produced by the practice of this invention can be employed as rubbers to make various elastomeric articles such as rubber goods, shoe soles and heels, industrial belts and vehicle tires. They may be reinforced with carbon black, pigmented with various materials such as rubber pigments and fillers. They may be cross-linked or vulcanized in the conventional manner by the use of sulfur vulcanization techniques or can be cross-linked by exposure to ionizing radiation in the conventional manner.

The practice of this invention is further illustrated by reference to the following examples which are intended to be representative rather than restrictive of the scope of the invention.

EXAMPLES

In the following examples, all reactions were carried out in 4 oz screw-cap bottles containing a dry-nitrogen atmosphere and fitted with self-sealing gaskets and poly(tetrafluroroethylene) liners. Catalyst solutions, modifiers and molecular weight regulator were added by hypodermic syringe. The cyclooctene (CO) was purified by distillation. Benzene was purified by acid washing followed by drying over magnesium sulfate and passing through a silica gel/alumina column under nitrogen atmosphere. The 1,5-cyclooctadiene (COD) which was used as a 50 percent solution in cyclohexane and cyclohexane were purified by column passing (silica gel/alumina). The $WCl_6 \cdot 1EtOH$ was made approximately 24 hours before use by adding the appropriate amount of absolute ethanol to the $WCl_6$ solution to give equal molar ratios of $WCl_6$ and $C_2H_5OH$. Benzene was employed as the solvent for all solutions in CO polymerizations, and cyclohexane for all solutions in COD polymerizations. All reactions were carried out at ambient temperature. Polymer cements were vacuum dried for approximately 24 hours.

Cis-vinylene content was determined from IR analyses.

Examples IA and IB illustrate results obtained without the use of component (D) and are controls or comparative experiments. Example II illustrates the results obtained when the modifier contains an alkyl group with a tertiary carbon attached to both ortho positions of the phenol and is also a comparative experiment.

Examples III through V illustrate the inventions and the results obtained when component D is used along with components (A), (B) and (C) in the ring opening polymerization of cyclooctene. Examples VI and VII illustrate the invention and results obtained when component (D) is used along with components (A), (B) and (C) in the ring opening of 1,5-cyclooctadiene.

EXAMPLE IA

Twenty-five ml cyclooctene was added to the reaction vessel, followed by forty microliter cis-2-pentene (molecular weight regulator). To this mixture 0.50 ml of 0.50 M $WCl_6 \cdot EtOH$ was added followed immediately by 0.50 ml of 0.20 M $EtAlCl_2$. After 1 hour the polymerization was shortstopped with methanol (MeOH) and the polymer dried. Results listed in Table I.

EXAMPLE IB

Procedure same as Example IA, except 0.25 ml of 0.20 M $EtAlCl_2$ was employed. Results listed in Table I.

EXAMPLE II

Procedure same as Example IA, except 0.60 ml of 0.25 M 2,6-di-t-butylphenol was added before the tungsten component. Results listed in Table I.

EXAMPLE III

Procedure same as Example IA, except 0.60 ml of 0.20 M 2-t-butyl-p-cresol was added before the tungsten component. Results listed in Table I.

EXAMPLE IV

Procedure same as Example IA, except 0.50 ml of 0.20 M 2-t-hexyl-p-cresol was added, followed by the addition of 0.50 ml of 0.20 M $EtAlCl_2$ and 15 sec later by 0.50 ml of 0.05 M $WCl_6 \cdot 1EtOH$. Results listed in Table I.

EXAMPLE V

Procedure same as Example IV, except employed 0.50 ml of 0.20 M 2-t-butyl-p-cresol in place of 2-t-hexylhexy-p-cresol. Results listed in Table I.

EXAMPLE VI

Fifty ml of 50 percent (vol) COD/cyclohexane solution was added to the reaction vessel. To this mixture 1.38 ml 0.125 M 2-t-butyl-p-cresol was added followed immediately by 0.75 ml of 0.025 M $WCl_6 \cdot 1EtOH$ and 0.43 ml of 0.20 M $EtAlCl_2$. After 18 hr polymerization was shortstopped with MeOH. Results listed in Table II.

EXAMPLE VII

Procedure same as Example VI except 0.75 ml of 0.125 M 2-t-butyl-p-cresol was employed, and EtAlCl$_2$ was added in two aliquots, the first aliquot was 0.095 ml, added immediately after WCl$_6$·1EtOH. The second aliquot was 0.34 ml added 73 min later. Results listed in Table II.

TABLE I
RESULTS OF CYCLOOCTENE POLYMERIZATIONS

| Example | Modifier | Yield (%) | cis-vinylene (%) |
|---------|----------|-----------|------------------|
| IA | — | 34 | 27 |
| IB | — | 64 | 53 |
| II | 2,6-di-t-butylphenol | 100 | 64 |
| III | 2-t-butyl-p-cresol | 87 | 95 |
| IV | 2-t-hexyl-p-cresol | 58 | 93 |
| V | 2-t-butyl-p-cresol | 83 | 93 |

TABLE II
RESULTS OF 1,5-CYCLOOCTADIENE POLYMERIZATIONS

| Example | Modifier | Yield (%) | cis-vinylene (%) |
|---------|----------|-----------|------------------|
| VI | 2-t-butyl-p-cresol | 7 | 98 |
| VII | 2-t-butyl-p-cresol | 5 | >99 |

As can be observed from Table I, the use of 2-t-butyl-p-cresol or 2-t-hexyl-p-cresol in the polymerization of cyclooctene with a tungsten halide salt, such as WCl$_6$ modified with ethyl alcohol, and ethylaluminum dichloride produces a polyoctenamer having cis-vinylene contents in excess of 90 percent. On the other hand, it can be observed that when no hindered phenol is employed, the cis vinylene content is considerably less than 85 percent. Even when 2,6-di-t-butyl phenol is employed, the cis-vinylene content is only 64 percent. Likewise, in Table II the use of 2-t-butyl-p-cresol, when employed in a catalyst system such as WCl$_6$ modified with ethyl alcohol along with ethyl-aluminum dichloride, yields a polybutenamer wherein the cis-vinylene content is in excess of 98 percent.

While certain representative embodiments and details have been shown for the purpose of illustrating the invention, it will be apparent to those skilled in this art that various changes and modifications may be made therein without departing from the spirit or scope of the invention.

What is claimed is:

1. The method which comprises polymerizing a cycloolefin selected from the group consisting of cyclooctene and 1,5-cyclooctadiene by subjecting said cycloolefin to a catalyst comprising (A) a tungsten halide salt of the general formula R$_{m-n}$WX$_n$ wherein X represents chlorine or bromine and R is selected from the group consisting of alkoxy, haloalkoxy, aryloxy, alkaryloxy, and acetyl acetonyl radicals containing up to 20 carbon atoms; m being 6 when X = Cl or 5 when X = Br; and wherein n may be 3 to 6 inclusive when X = Cl or 3 or 5 inclusive when X = Br and (B) an organoaluminum compound of the formula:

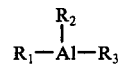

wherein R$_1$, R$_2$ and R$_3$ may independently represent an alkyl or aralkyl radical containing up to 20 carbon atoms or a halogen atom, and (C) a hydroxyl compound which is phenol or o-, m- or p-cresol or which is of the formula ROH wherein R is selected from the group consisting of alkyl, haloalkyl, cycloalkyl, aralkyl and alkoxyalkyl containing up to 20 carbon atoms, and (D) a hindered phenol of the formula

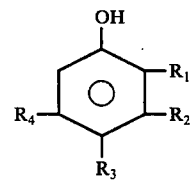

wherein R$_1$ represents an alkyl group with a tertiary carbon attached to the aromatic ring, and R$_2$, R$_3$ and R$_4$ represent either a hydrogen atom or an alkyl group containing up to 20 carbon atoms, to form polyalkenamers having a cisvinylene content of at least about 85 percent, and wherein the molar ratio of A:B:C:D ranges from 1:2–8:0.5–3:3—24.

2. The method of claim 1 in which the hindered phenol is 2-t-butyl phenol.

3. The method of claim 1 in which the hindered phenol is 2-t-butyl-p-cresol.

4. The method of claim 1 in which the hindered phenol is 6-t-butyl-m-cresol.

5. The method of claim 1 in which the hindered phenol is 2-t-hexyl-p-cresol.

6. The method of claim 1 in which the tungsten halide salt is tungsten hexacloride, the organoaluminum compound is ethylaluminum dichloride, the hydroxy compound is ethyl alcohol, and the hindered phenol is 2-t-butyl-p-cresol.

* * * * *